United States Patent
Wu

(10) Patent No.: US 11,714,547 B2
(45) Date of Patent: Aug. 1, 2023

(54) TRIMS FOR MEMORY PERFORMANCE TARGETS OF APPLICATIONS

(71) Applicant: Micron Technology, Inc., Boise, ID (US)

(72) Inventor: Minjian Wu, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 445 days.

(21) Appl. No.: 17/049,276

(22) PCT Filed: Jun. 5, 2020

(86) PCT No.: PCT/CN2020/094651
§ 371 (c)(1),
(2) Date: Oct. 20, 2020

(87) PCT Pub. No.: WO2021/243700
PCT Pub. Date: Dec. 9, 2021

(65) Prior Publication Data
US 2023/0126523 A1    Apr. 27, 2023

(51) Int. Cl.
*G06F 12/00* (2006.01)
*G06F 3/06* (2006.01)
*G06F 9/50* (2006.01)

(52) U.S. Cl.
CPC ............ *G06F 3/0604* (2013.01); *G06F 3/064* (2013.01); *G06F 3/0644* (2013.01); *G06F 3/0673* (2013.01); *G06F 9/5016* (2013.01); *G06F 2209/501* (2013.01); *G06F 2212/1016* (2013.01)

(58) Field of Classification Search
CPC ...... G06F 3/0604; G06F 3/064; G06F 3/0644; G06F 3/0673; G06F 9/5016; G06F 2209/501; G06F 2212/1016
See application file for complete search history.

(56) References Cited

U.S. PATENT DOCUMENTS

| 9,589,645 B2 | 3/2017 | Dusija et al. | |
| 2006/0112253 A1* | 5/2006 | Takeda | G06F 16/182 711/170 |
| 2007/0283107 A1* | 12/2007 | Ozaki | G06F 11/3409 711/154 |

(Continued)

FOREIGN PATENT DOCUMENTS

| CN | 106844050 | 10/2011 |
| CN | 103136120 | 6/2013 |
| CN | 106407010 | 2/2017 |

OTHER PUBLICATIONS

International Search Report and Written Opinion for related PCT Application No. PCT/CN2020/094651, dated Feb. 24, 2021, 9 pages.

*Primary Examiner* — John A Lane
(74) *Attorney, Agent, or Firm* — Brooks, Cameron & Huebsch, PLLC

(57) ABSTRACT

A memory sub-system can receive a definition of a performance target for each of a number of applications that use the memory sub-system for storage. The memory sub-system can create a plurality of partitions according to the definitions and assign each of the partitions to a block group. The memory sub-system can operate each block group with a trim tailored to the performance target corresponding to that block group and application.

22 Claims, 4 Drawing Sheets

(56) References Cited

U.S. PATENT DOCUMENTS

| | | | |
|---|---|---|---|
| 2008/0244183 A1* | 10/2008 | Ishikawa | G06F 12/0875 |
| | | | 711/E12.019 |
| 2011/0242897 A1 | 10/2011 | Aritome | |
| 2014/0149648 A1* | 5/2014 | Roohparvar | G11C 11/5621 |
| | | | 711/103 |
| 2016/0274800 A1* | 9/2016 | Earhart | G06F 3/064 |
| 2016/0291883 A1 | 10/2016 | Manohar et al. | |
| 2019/0361625 A1 | 11/2019 | Eliash et al. | |
| 2020/0285421 A1* | 9/2020 | Liikanen | G11C 16/3459 |
| 2022/0214821 A1* | 7/2022 | Palmer | G06F 3/0631 |
| 2023/0067246 A1* | 3/2023 | Dhuse | H04L 63/0428 |

\* cited by examiner

TRIMS FOR MEMORY PERFORMANCE TARGETS OF APPLICATIONS

PRIORITY INFORMATION

This application is a National Stage Application under 35 U.S.C. § 371 of International Application Number PCT/CN2020/094651, filed on Jun. 5, 2020, the contents of which are incorporated herein by reference.

TECHNICAL FIELD

Embodiments of the disclosure relate generally to memory sub-systems, and more specifically, relate to trims for memory performance targets of applications.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

Vehicles are becoming more dependent upon memory sub-systems to provide storage for components that were previously mechanical, independent, or non-existent. A vehicle can include a computing system, which can be a host for a memory sub-system. The computing system can run applications that provide component functionality. The vehicle may be driver operated, driver-less (autonomous), and/or partially autonomous. The memory device can be used heavily by the computing system in a vehicle.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
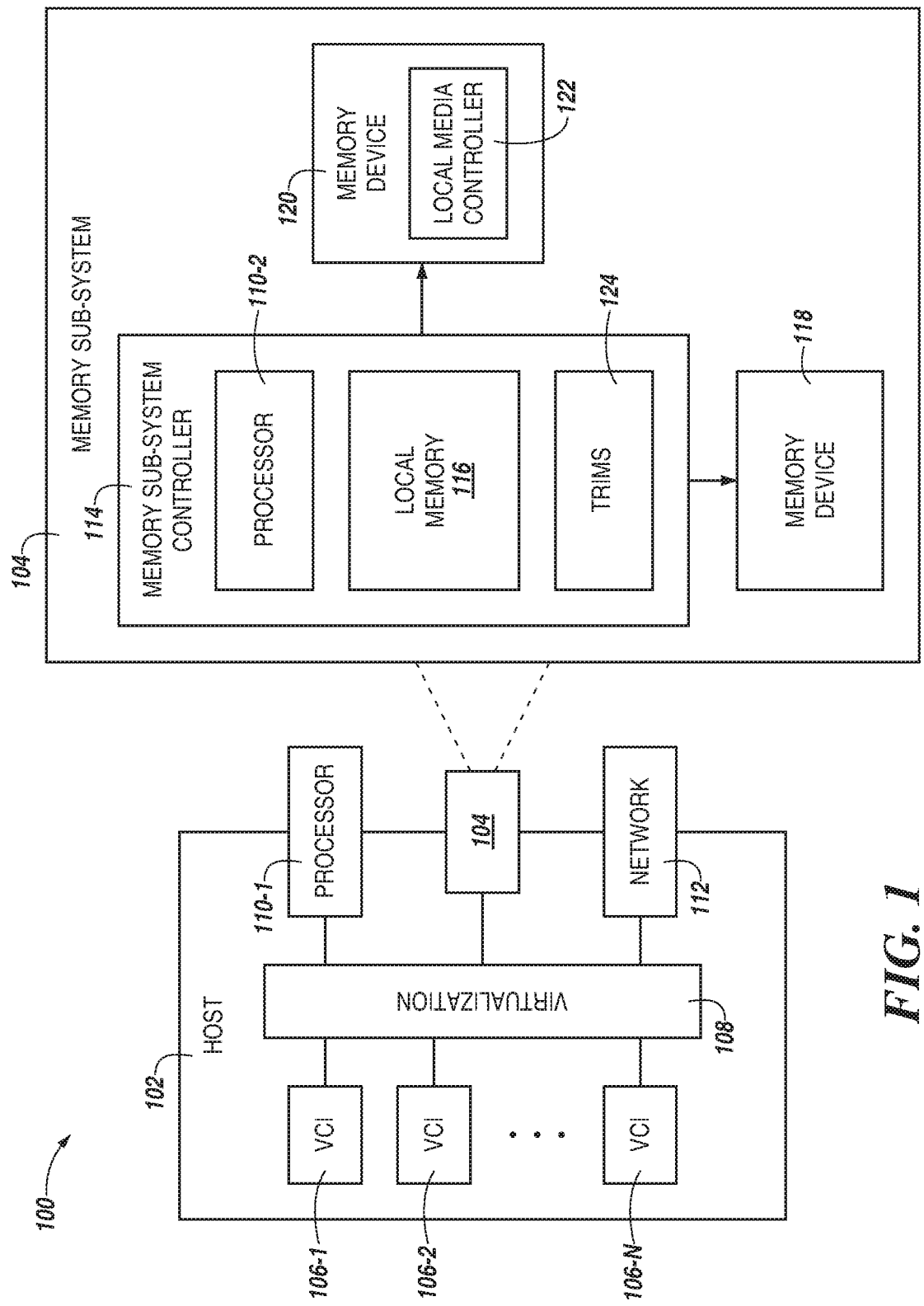
FIG. 1 illustrates an example computing system that includes a memory sub-system in accordance with some embodiments of the present disclosure.

Aspects of the present disclosure are directed to using multiple trims tailored to performance targets for block groups of a memory sub-system. For example, a vehicle can include a memory sub-system, such as a solid state drive (SSD). The memory sub-system can be used for storage of data by various components of the vehicle, such as applications that are run by a host system of the vehicle. Examples of such applications include the instrument cluster of the vehicle, a black box of the vehicle, and an infotainment system of the vehicle. Additional details of such applications are described with respect to FIG. 2 below. Different applications can have different performance targets for the storage of data in the memory sub-system based on the needs of the different applications. As such, it can be beneficial to operate different block groups of the memory sub-system with different trims tailored to those performance targets for the different applications.

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced as 204 in FIG. 2. Analogous elements within a Figure may be referenced with a hyphen and extra numeral or letter. Such analogous elements may be generally referenced without the hyphen and extra numeral or letter. For example, elements 106-1, 106-2, and 106-N in FIG. 1 may be collectively referenced as 106. As used herein, the designators "N" and "P", particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 illustrates an example computing system 100 that includes a memory sub-system 104 in accordance with some embodiments of the present disclosure. The memory sub-system 104 can include media, such as one or more volatile memory devices 118, one or more non-volatile memory devices 120, or a combination thereof. The volatile memory devices 118 can be, but are not limited to, random access memory (RAM), such as dynamic random access memory (DRAM), synchronous dynamic random access memory (SDRAM), and resistive DRAM (RDRAM).

A memory sub-system 104 can be a storage device, a memory module, or a hybrid of a storage device and memory module. Examples of a storage device include an SSD, a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 includes a host system 102 that is coupled to one or more memory sub-systems 104. In some embodiments, the host system 102 is coupled to different types of memory sub-systems 104. FIG. 1 illustrates an example of a host system 102 coupled to one memory sub-system 104. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 102 includes or is coupled to processing resources, memory resources, and network resources. As used herein, "resources" are physical or virtual components that have a finite availability within a computing system 100. For example, the processing resources include a processing device 110-1 (or a number of processing devices), the memory resources include memory sub-system 104 for secondary storage and main memory devices (not specifically illustrated) for primary storage, and the network resources include as a network interface 112. The processing device 110-1 can be one or more processor chipsets, which can execute a software stack. The processing device 110-1 can include one or more cores, one or more caches, a memory controller (e.g., NVDIMM controller), and a storage protocol controller (e.g., PCIe controller, SATA controller, etc.). The host system 102 uses the memory sub-system 104, for example, to write data to the memory sub-system 104 and read data from the memory sub-system 104.

The host system 102 can be configured to provide virtualized or non-virtualized access to the memory sub-system 104 and/or the processing resources and network resources. Virtualization can include abstraction, pooling, and automation of the processing, memory, and/or network resources. FIG. 1 generally illustrates the host system 102 providing virtualized access while FIG. 4 generally illustrates the host system providing non-virtualized access.

To provide such virtualization, the host system 102 incorporates a virtualization layer 108 (e.g., hypervisor, virtual machine monitor, etc.) that can execute a number of virtual computing instances (VCIs) 106-1, 106-2, . . . , 106-N. The virtualization layer 108 can provision the VCIs 106 with processing resources and memory resources and can facilitate communication for the VCIs 106 via the network interface 112. The virtualization layer 108 represents an executed instance of software run by the host system 102. The term "virtual computing instance" covers a range of computing functionality. VCIs may include non-virtualized physical hosts, virtual machines (VMs), and/or containers. Containers can run on a host operating system without a hypervisor or separate operating system, such as a container that runs within Linux. A container can be provided by a virtual machine that includes a container virtualization layer (e.g., Docker). A VM refers generally to an isolated end user space instance, which can be executed within a virtualized environment. Other technologies aside from hardware virtualization that can provide isolated application instances may also be referred to as VCIs. The term "VCI" covers these examples and combinations of different types of VCIs, among others.

VMs, in some embodiments, operate with their own guest operating systems on the host system 102 using the resources of the host virtualized by the virtualization layer 108. The tenant (i.e., the owner of the VM) can choose which applications to operate on top of the guest operating system. Some containers, on the other hand, are constructs that run on top of a host operating system without the need for a hypervisor or separate guest operating system. The host operating system can use name spaces to isolate the containers from each other and therefore can provide operating-system level segregation of the different groups of applications that operate within different containers. This segregation is akin to the VM segregation that may be offered in hypervisor-virtualized environments that virtualize system hardware, and thus can be viewed as a form of virtualization that isolates different groups of applications that operate in different containers. Such containers may be more lightweight than VMs.

The VCIs 106 can therefore represent applications that run on the virtualization layer 108 or on a operating system executed by the host system 102. By way of example, the first VCI 106-1 is an application that provides an instrument cluster for a vehicle, the second VCI 106-2 is an application that provides a black box for the vehicle, and the third VCI 106-N is an application that provides an infotainment system for the vehicle. Embodiments are not limited to these specific examples of applications.

The host system 102 can be coupled to the memory sub-system 104 via a physical host interface. Examples of a physical host interface include, but are not limited to, a serial advanced technology attachment (SATA) interface, a PCIe interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 102 and the memory sub-system 104. The host system 102 can further utilize an NVM Express (NVMe) interface to access the non-volatile memory devices 120 when the memory sub-system 104 is coupled with the host system 102 by the PCIe interface. The physical host interface can provide an interface for passing control, address, data, and other signals between the memory sub-system 104 and the host system 102. FIG. 1 illustrates a memory sub-system 104 as an example. In general, the host system 102 can access multiple memory sub-systems via a same communication connection, multiple separate communication connections, and/or a combination of communication connections.

The host system 102 can send requests to the memory sub-system 104, for example, to store data in the memory sub-system 104 or to read data from the memory sub-system 104. The data to be written or read, as specified by a host request, is referred to as "host data." A host request can include logical address information. The logical address information can be a logical block address (LBA), which may include or be accompanied by a partition number. The logical address information is the location the host system associates with the host data. The logical address information can be part of metadata for the host data. The LBA may also correspond (e.g., dynamically map) to a physical address, such as a physical block address (PBA), that indicates the physical location where the host data is stored in memory.

An example of non-volatile memory devices 120 include not-and (NAND) type flash memory. NAND type flash memory includes, for example, two-dimensional NAND (2D NAND) and three-dimensional NAND (3D NAND). The non-volatile memory devices 120 can be other types of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM), and three-dimensional cross-point memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Each of the non-volatile memory devices 120 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the non-volatile memory devices 120 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the non-volatile memory devices 120 can be grouped as pages that can refer to a logical unit of the memory device used to store data. With some types of memory (e.g., NAND), pages can be grouped to form blocks.

The memory sub-system controller 114 (or controller 114 for simplicity) can communicate with the non-volatile memory devices 120 to perform operations such as reading data, writing data, erasing data, and other such operations at the non-volatile memory devices 120. The memory sub-system controller 114 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 114 can be a microcontroller, special purpose logic circuitry (e.g., a field programmable gate array (FPGA), an application specific integrated circuit (ASIC), etc.), or other suitable circuitry.

The memory sub-system controller 114 can include a processing device 110-2 (e.g., a processor) configured to execute instructions stored in local memory 116. In the illustrated example, the local memory 116 of the memory sub-system controller 114 is an embedded memory configured to store instructions for performing various processes, operations, logic flows, and routines that control operation of the memory sub-system 104, including handling communications between the memory sub-system 104 and the host system 102.

In some embodiments, the local memory 116 can include memory registers storing memory pointers, fetched data, etc. The local memory 116 can also include ROM for storing micro-code, for example. While the example memory sub-system 104 in FIG. 1 has been illustrated as including the memory sub-system controller 114, in another embodiment of the present disclosure, a memory sub-system 104 does not include a memory sub-system controller 114, and can instead rely upon external control (e.g., provided by an external host, or by a processor or controller separate from the memory sub-system 104).

In general, the memory sub-system controller 114 can receive information or operations from the host system 102 and can convert the information or operations into instructions or appropriate information to achieve the desired access to the non-volatile memory devices 120 and/or the volatile memory devices 118. The memory sub-system controller 114 can be responsible for other operations such as wear leveling operations, error detection and/or correction operations, encryption operations, caching operations, and address translations between a logical address (e.g., logical block address) and a physical address (e.g., physical block address) associated with the non-volatile memory devices 120. The memory sub-system controller 114 can further include host interface circuitry to communicate with the host system 102 via the physical host interface. The host interface circuitry can convert a query received from the host system 102 into a command to access the non-volatile memory devices 120 and/or the volatile memory devices 118 as well as convert responses associated with the non-volatile memory devices 120 and/or the volatile memory devices 118 into information for the host system 102.

In some embodiments, the non-volatile memory devices 120 include a local media controller 122 that operates in conjunction with memory sub-system controller 114 to execute operations on one or more memory cells of the memory devices 120. An external controller (e.g., memory sub-system controller 114) can externally manage the non-volatile memory device 120 (e g., perform media management operations on the memory device 120). In some embodiments, a memory device 120 is a managed memory device, which is a raw memory device combined with a local controller (e.g., local controller 122) for media management within the same memory device package. An example of a managed memory device is a managed NAND device.

In at least one embodiment, the block labeled "trims" 124 represents trim circuitry 124. As used herein, the trim circuitry 124 can comprise an ASIC configured to perform the examples described herein. For example, the trim circuitry 124 can operate different block groups of the non-volatile memory devices 120 with different trims tailored to different performance targets. The block groups and additional functionality of the trim circuitry 124 and of the memory sub-system controller 114 and/or the local media controller 122 are described in more detail with respect to FIG. 2. In some embodiments, a local media controller 122 of the non-volatile memory devices 120 includes at least a portion of the trim circuitry 124. For example, the local media controller 122 can include a processor (e.g., processing device) configured to execute instructions stored on the volatile memory devices 118 for performing the operations described herein. In some embodiments, the trim circuitry 124 is part of the host system 102, an application, or an operating system.

In at least one embodiment, the block labeled "trims" 124 represents data or instructions (e.g., trims or set trim commands) stored in the memory sub-system 104. The functionality described with respect to the trim circuitry 124 can be embodied in machine-readable and executable instructions stored in a tangible machine-readable medium.

Trims are sets of operating parameters, such as voltages, which can be used to operate memory cells. A controller, such as the memory sub-system controller 114 or the local media controller 122 can issue a set trim command, which causes the non-volatile memory devices 120 to use a particular set of operating parameters to operate the memory cells of the non-volatile memory devices 120. Trims can include operating parameters associated with various operations such as program (write), program verify, erase, erase verify, and sense (read), among other operations associated with an array of memory cells. Examples of trims include programming voltages, programming frequency, and programming time length.

Trims can be used to achieve or adjust desired threshold voltage (Vt) distributions and/or the voltage spread between different Vt distributions for different data states for memory cells of the non-volatile memory devices 120. Trims can be used to cause the non-volatile memory devices 120 to be operated with different program times. Different trims can be used for different operations such as programming, reading, and erasing, to achieve different performance targets such as programming speed, reading speed, data retention over time (how long a memory cell reliably stores the data programmed thereto), and memory cell endurance (how reliably a memory cell operates after various quantities of program/ erase cycles). The effects of different trims on different performance targets can be known based on testing, historical observation, theoretical modeling, active monitoring of the operation of a memory device, and other methods. For example, a faster programming time may provide better programming speed, but may yield relatively poor data retention over time. A slower programming time may provide slower programming speed but may yield better data retention over time.

Examples of trims include a program start voltage, a program step voltage, a program inhibit start voltage, and an erase verify voltage. The program start voltage is the magnitude of an initial programming voltage pulse of a series of voltage pulses applied to a selected word line during a programming operation performed on memory cells in a selected block. The program step voltage is the voltage step size between programming voltage pulses. The program inhibit start voltage is a voltage used to inhibit further programming of memory cells once the Vt level associated with a desired data state has been reached. The erase verify voltage is the voltage used to check whether memory cells in the selected block have a Vt level indicative of the erase state.

Other examples of trims include read reference voltages and/or program verify voltages. Program verify voltages represent target voltage levels to which memory cells are to be programmed in order to represent a particular data state. Read reference voltages are voltage levels that can be located between program Vt distributions and used to determine a particular data state of a data cell during a data read operation.

The memory sub-system 104 can also include additional circuitry or components that are not illustrated. In some embodiments, the memory sub-system 104 can include a cache or buffer (e.g., DRAM) and address circuitry (e.g., a row decoder and a column decoder) that can receive an address from the memory sub-system controller 114 and decode the address to access the non-volatile memory devices 120.

Figure 2:
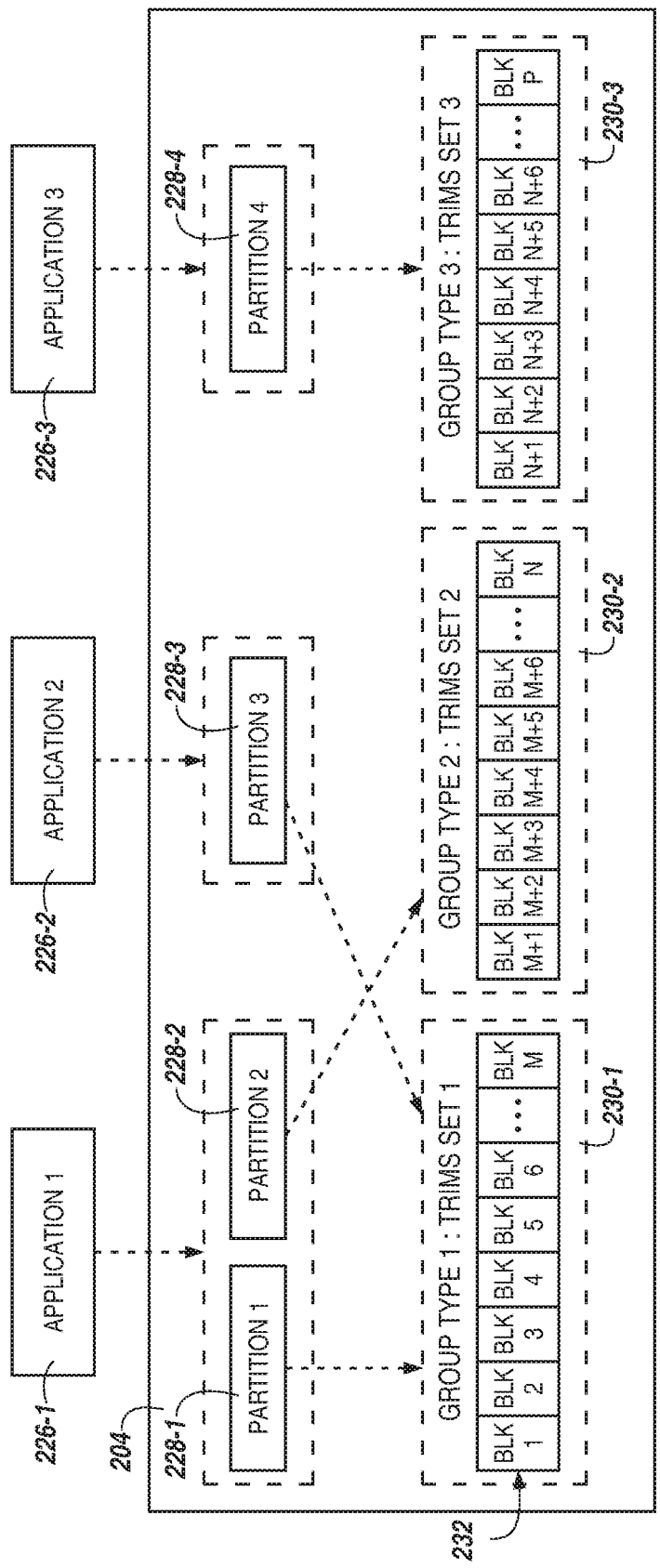
FIG. 2 is a block diagram of a memory sub-system providing storage for applications in accordance with some embodiments of the present disclosure.

FIG. 2 is a block diagram of a memory sub-system 204 providing storage for applications 226 in accordance with some embodiments of the present disclosure. The memory sub-system 204 is illustrated as communicating with a first application 226-1, a second application 226-2, and a third application 226-3. Embodiments are not limited to a particular quantity of applications. The applications 226 can be vehicle applications. According to an example described herein, the first application 226-1 is an infotainment system, the second application 226-2 is an instrument cluster, and the third application 226-3 is a black box. The applications can be executed by a host system (not illustrated). In at least one embodiment, the applications 226 are analogous to the VCIs 106 illustrated in FIG. 1 (e.g., where each application 226 is a different VCI). Providing storage for many different integrated systems with one memory sub-system 204 can be a cost effective solution, but presents technical challenges for the memory sub-system 204 to handle the different performance targets of the different integrated systems and applications 226.

An infotainment system for a vehicle may also be referred to as in-vehicle entertainment. It is a collection of hardware and software that provides audio and/or video entertainment. A navigation system, such as a global positioning system, may be associated with an infotainment system and/or an instrument cluster. The infotainment system can include or be connected to the vehicle's audio system. The infotainment system can include a radio, optical disc player, stored media player, USB, Bluetooth, WiFi, handsfree voice control, and other features. The infotainment system may have a relatively large data storage requirement. For example, the total bytes written (TBW) can be large for items such as high density (HD) maps for the navigation system or for updates performed over the air. However, the TBW requirement is not as great as that of the black box (described below). Because the infotainment system can represent different functionalities, in some embodiments, the infotainment system can have more than one performance target. For example, a first performance target for storage for the infotainment system is good data retention and a second performance target for storage for the infotainment system is balanced data retention and memory cell endurance. The first performance target can be for the stored media player of the infotainment system. The second performance target can be for the navigation system of the infotainment system.

The instrument cluster for a vehicle can provide information related to operation of the vehicle and its components (e.g., engine, cooling system, transmission, electrical system, suspension, fuel system, etc.). Examples of the functionality provided by an instrument cluster include a speedometer, tachometer, fuel gauge, battery gauge, tire pressure monitoring, oil temperature, exhaust temperature, battery temperature, etc. Some of this functionality may have been previously provided by mechanical or independent electrical components. However, more modern vehicles, may have digital instrument clusters that are provided as applications run by a computing system that aggregate data from various vehicle systems and present it to the user. The instrument cluster may have a relatively small storage size requirement. Typically, a relatively small amount of data is written to storage for the instrument cluster, however that data is frequently accessed. Accordingly, a performance target for storage for the instrument cluster is good data retention across a wide range of temperatures to which the vehicle may be exposed.

The black box for a vehicle may also be referred to as an accident data recorder. The emergence of autonomous vehicles, Internet of Things (IOT) and surveillance devices has resulted in a wider gap in between the TBW in a useable lifetime of a memory sub-system and a user capacity of the memory sub-system. For example, with the advent of autonomous vehicles, some autonomous driving requires real time buffering of telemetric data such as video cameras, RADAR, LIDAR, ultra-sonic and other sensors necessary to playback the sequences preceding an accident. The data from various sensors yields a considerable quantity of data per unit time for sequential write throughput from a host system. Upon an event thirty (30) seconds of playback time immediately preceding an event needs to be captured to determine the cause of an incident. A playback may be referred to as a "snapshot". The storage of such information is referred to herein as a black box. A black box is one such application in where the user capacity requirement could be as low as one hundred and twenty-eight (128) GB, but the TBW requirement could be as high as hundreds of Peta Bytes. The examples of values given are not limiting but highlight the relative difference between the requirements for capacity and TBW. A black box may need to store at least a few, most recent snapshots. A performance target for storage for the black box is significant write performance for large TBW where memory cell endurance is important because the memory cells will be subject to many program/erase cycles.

For each application 226 that uses the memory sub-system 204 for storage, the memory sub-system 204 can receive (e.g., from a host system) a respective definition of a performance target. The memory sub-system 204 can receive a definition of a respective quantity of performance targets for each application 226. Examples of the performance targets include data retention, memory cell endurance, and balanced data retention and memory cell endurance. The memory sub-system 204 (e.g., by a controller thereof) can create a plurality of partitions 228 according to the definitions. A partition 228 can be created for each application 226 and additional partitions can be created for applications 226 that have more than one performance target. A partition 228 can be created for each performance target that is defined for a given application 226. If one performance target is defined for one application 226, then one partition 228 can be created for that application 226. As illustrated in FIG. 2, the second application 226-2 and the third application 226-3 each have one respective partition 228-3, 228-4 created therefor indicating that only one performance target was defined for each. If more than one (e.g., two) performance target is defined for one application 226, then more than one (e.g., two) partition 228 can be created for that application 226. As illustrated in FIG. 2, the first application 226-1 has two partitions 228-1, 228-2 created therefor, indicating that two performance targets were defined therefor. The memory sub-system 204 can associate each partition 228 with a respective performance target.

The memory sub-system 204 can logically divide physical blocks (e.g., block 232) of the memory device (e.g., the non-volatile memory device 120 illustrated in FIG. 1) into a quantity of block groups 230 equal in number to a quantity of unique performance targets of the plurality of applications 226 that use the system for storage. The quantity of unique performance targets is the total number of performance targets received that are not duplicates of a previously received performance target. For example with respect to FIG. 2, the first application 226-1 is an infotainment system having two performance targets: (1) data retention and (2) balanced data retention and memory cell endurance; the second application 226-2 is an instrument cluster having one performance target: data retention; and the third application 226-3 is a black box having one performance target: memory cell endurance. Because the first performance target for the first application 226-1 is the same as the performance target for the second application 226-2, this only counts as one unique performance target, whereas the second performance target for the first application 226-1 and the performance target for the third application 226-3 are each unique. In total, there are three unique performance targets in this example, so the physical blocks of the memory device are divided into a first block group 230-1, a second block group 230-2, and a third block group 230-3.

The memory sub-system 204 can assign each of the partitions 228 to a respective block group 230 and operate each of the block groups 230 with a different trim tailored to the respective unique performance target corresponding to the block group 230. More than one of the partitions 228 can be assigned to one of the block groups 230 in response to more than one of the partitions (e.g., partitions 228-1, 228-3) having a same performance target. As illustrated in FIG. 2, the first partition 228-1 and the third partition 228-3 (having a performance target of data retention) are assigned to the first block group 230-1; the second partition 228-2 (having a performance target of balanced data retention and memory cell endurance) is assigned to the second block group 230-2; and the fourth partition 228-4 (having a performance target of memory cell endurance) is assigned to the third block group 230-3. The first block group 230-1 can be operated with a first trim ("trims set 1"), the second block group 230-2 can be operated with a second trim ("trims set 2"), and the third block group 230-3 can be operated with a third trim ("trims set 3"). In the example described herein, the first trim can be tailored to data retention; the second trim can be tailored to balanced data retention and memory cell endurance; and the third trim can be tailored to memory cell endurance.

The memory sub-system 204 can operate a particular block groups 230 by issuing a set trim command to cause the memory device to use the trim for commands directed to the particular block group 230. The set trim command can be issued in response to receipt of a request from a host system directed to a different one of the block groups 230 than a previously fulfilled request. Each of the block groups 230 can be operated as a separate logical unit with a respective trim. In such embodiments, when the memory sub-system 204 divides the blocks into block groups, the division would follow logical unit boundaries. Logical units are described in more detail with respect to FIG. 3. In some embodiments, each of the block groups 230 can be operated as part of one logical unit. In such embodiments, a set trim command can be issued to the logical unit to operate a second block group 230-2 with a second trim after operating a first block group 230-1 with a first trim. A set trim command can be sent, in such embodiments, when changing operations from one block group 230 to another.

In some embodiments, the host system, which runs the applications 226, can provide to the memory sub-system 204 a definition of a size of each of the partitions 228 (in addition to providing the definition of the performance targets for each application 226). By providing such a definition, the host system does not necessarily specify what partitions are created. Rather, the host can specify how much storage is needed for each application 226, and more specifically, for each performance target of each application 226. The memory sub-system can use this information to create the partitions 228 with sufficient backing storage in the block groups 230. The partitions 228, for example, can be correlated with LBA ranges that correspond to sufficient physical storage therefor. The memory sub-system 204 can provide the LBA range for each partition 228 and an additional logical address (e.g., a partition identifier) to the host system for each partition 228 that is created. Subsequently, the host system can address requests to the memory sub-system with a respective partition identifier corresponding to the respective performance target for each of the applications 226 and the memory sub-system 204 can receive memory access requests from the host system using the respective logical addresses (partition identifiers) and LBAs. The memory sub-system 204 can store a correspondence between each partition 228 and block group 230 in an address table. The address table can also specify the logical addresses of the partitions (partition identifiers) and their respective LBA ranges.

The memory sub-system 204 can be configured to perform wear leveling on each of the block groups 230 separately. Wear leveling is used to control the wear rate on the memory blocks. Wear leveling can increase the life of a non-volatile memory device that can experience failure after a number of program/erase cycles. Wear leveling can include dynamic wear leveling to minimize the amount of valid blocks moved to reclaim a block. Dynamic wear leveling can include a technique called garbage collection in which blocks with a number of invalid pages (i.e., pages with data that has been re-written to a different page and/or is no longer needed on the invalid pages) are reclaimed by erasing the block. Static wear leveling includes writing static data to blocks that have high erase counts to prolong the life of the block. The relationship between pages and blocks is described in more detail with respect to FIG. 3. According to at least one embodiment of the present disclosure, it is advantageous to perform wear leveling on each of the block groups 230 individually because they are operated with different trims. The blocks in the different block groups 230 are used to achieve different performance targets, which could be adversely affected by wear leveling across the block groups 230. For example, blocks that are intended to be used for memory cell endurance (fewer program/erase cycles) would normally be erased and used to store new data according to most wear levelling algorithms to balance the program/erase cycle count across all blocks in the memory sub-system 204.

Figure 3:
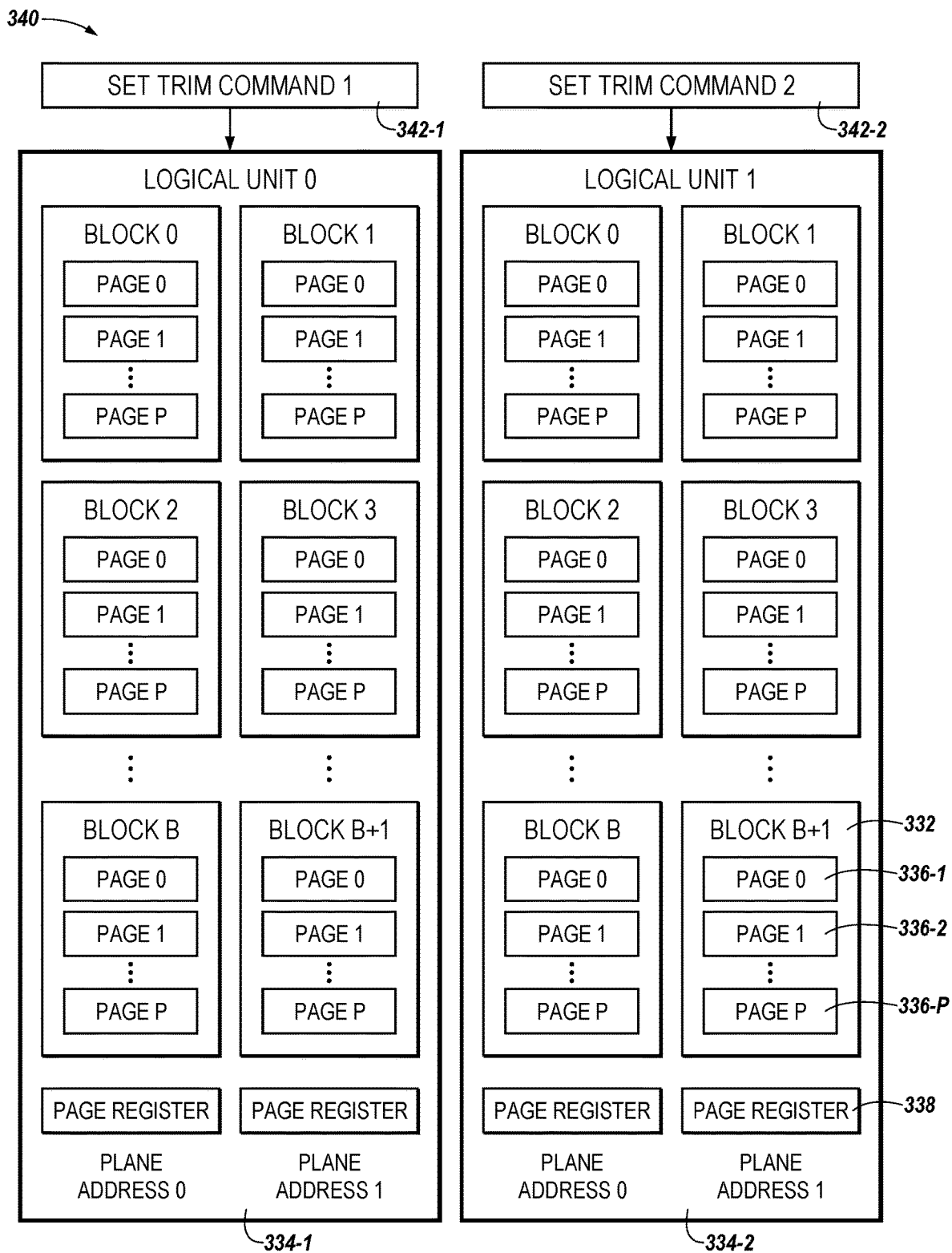
FIG. 3 illustrates a diagram of a portion of a memory array having a plurality of physical blocks in accordance with some embodiments of the present disclosure.

FIG. 3 illustrates a diagram of a portion of a memory array 340 having a plurality of physical blocks in accordance with some embodiments of the present disclosure. The memory array 340 can be a component of the non-volatile memory device 120 illustrated in FIG. 1. The memory array 340 includes a number of logical units such as "Logical Unit 0" 334-1 and "Logical Unit 1" 334-2. Each logical unit 334 is divided into two planes "Plane Address 0" and "Plane Address 1." Embodiments are not limited to any particular number of planes per logical unit 334. Each logical unit 334 includes a number of blocks. Each block can include a number of pages of memory cells, such as "Page 0" 336-1, "Page 1" 336-2, . . . , "Page P" 336-P illustrated in "Block B+1" 332 of "Logical Unit 1" 334-2. Each logical unit 334 can be on its own memory die or multiple logical units 334 can be on a same memory die.

Each plane is in bidirectional communication with a page register (e.g., a memory page register, a strobe register, etc.), such as the page register 338 for "Plane Address 1" of "Logical Unit 1" 334-2. The page register 338 can store an amount of data equal to a page size of the memory device. Data can be transferred from the page register to the memory plane during write operations. Data can also be transferred from the memory plane to the page register during read operations. Data can be transferred from the page register to a bus (not specifically illustrated) and/or to the page register from the bus.

Each page of memory cells can include a number of memory cells (e.g., non-volatile memory cells). As used herein, a page of memory cells means a number of memory cells which can store an amount of data programmable at one time. As an example, the amount of data programmable at one time can be referred to as a page of data, and the memory cells which store the page of data can be referred to as a page of memory cells. In one or more embodiments, a page of memory cells can include memory cells coupled to a particular access line (e.g., word line). In one or more embodiments, memory cells coupled to a particular word line can be divided into more than one page of data. In one or more embodiments, a page of memory cells can include memory cells coupled to more than one word line. For embodiments including multilevel cells, the number of memory cells programmable at one time can store multiple pages of data (e.g., an upper page of data and a lower page of data, with each memory cell storing one or more bits towards an upper page of data and one or more bits towards a lower page of data). As used herein, a block of memory cells means a number of memory cells which can store an amount of data erasable at one time. For example, the amount of data erasable at one time can be referred to as a block of data, and the memory cells which store the block of data can be referred to as a block of memory cells.

Each logical unit 334 can be operated with different trims. A controller, such as the memory sub-system controller 114 or the local media controller 122 illustrated in FIG. 1 can issue a set trim command 342, which causes the logical units 334 to use a particular trim (set of operating parameters) to operate the memory cells of the logical unit 334. For example, a first set trim command 342-1 can be issued to the first logical unit 334-1 and a second set trim command 342-2 can be issued to the second logical unit 334-2. In general, once a set trim command 342 has been issued to logical unit 334, it will operate according to the set trim command 342 until a different set trim command 342 is sent. According to at least one embodiment of the present disclosure, the trims associated with the set trim commands 342 are tailored to performance targets of applications for which data is stored in block groups. If a block group for a particular application is part of one logical unit, such as "Logical Unit 0" 334-1, and no other block groups are part of that logical unit 334-1, then only one set trim command 342-1 needs to be used to cause that block group to be operated with the desired trims. However, if that logical unit 334-1 includes blocks that are part of different block groups associated with different applications that have different performance targets, then a set trim command 342 can be issued to operate a second block group with a second trim after operating a first block group with a first trim. The same is true for embodiments in which the entire memory is operated as a single logical unit 334 (a set trim command 342 is issued to cause the logical unit 334 to use the trims for operations directed to a particular block group that has a different performance target than a previous operation). The controller is configured to issue the set trim command 342 in response to receipt of a request from a host system directed to a different one of the block groups than a previously fulfilled request.

Figure 4:
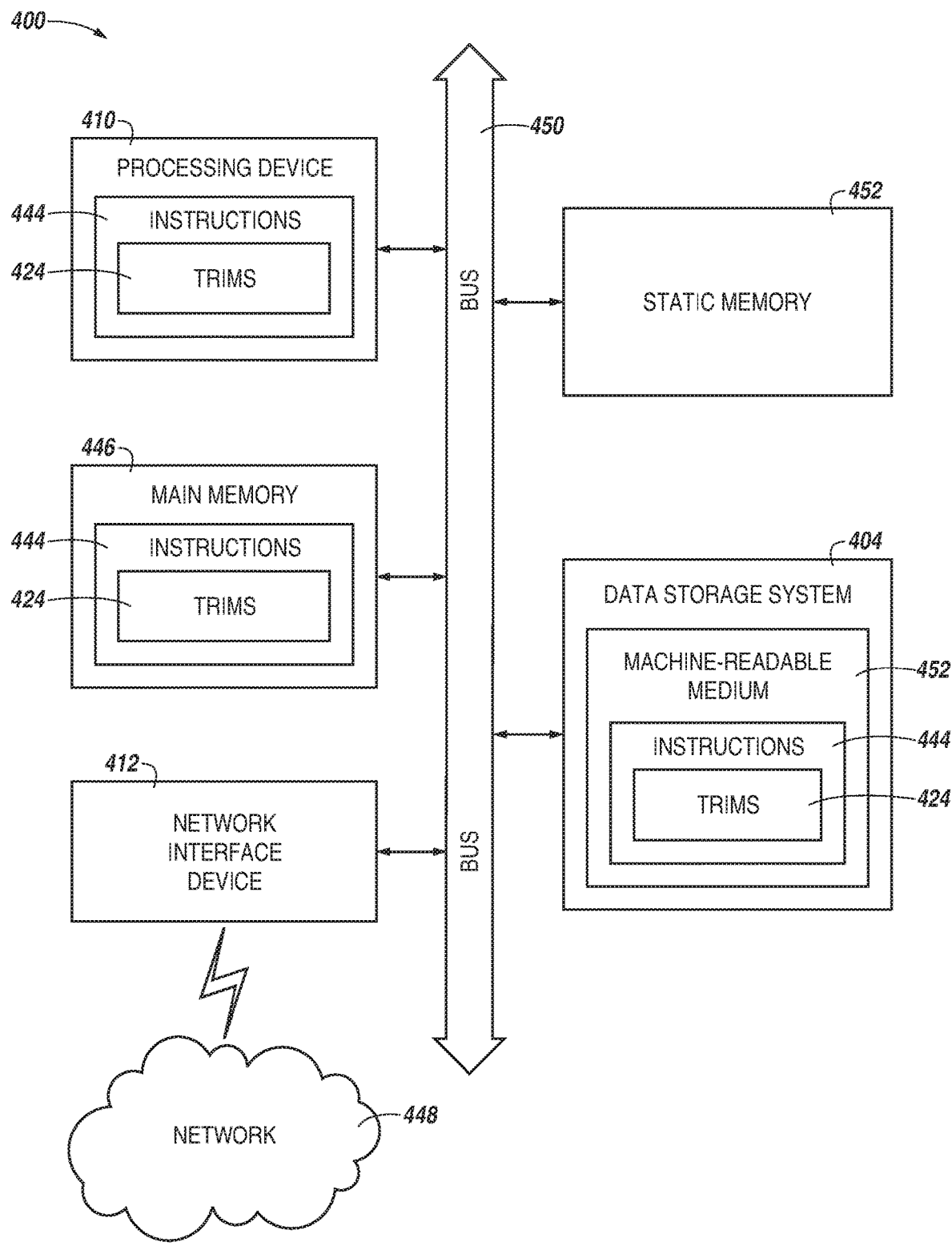
FIG. 4 is a block diagram of an example computer system in which embodiments of the present disclosure may operate.

FIG. 4 is a block diagram of an example computing system 400 in which embodiments of the present disclosure may operate. Within the computing system 400, a set of instructions, for causing a machine to perform one or more of the methodologies discussed herein, can be executed. The computing system 400 includes a processing device 410, a main memory 446, a static memory 452 (e.g., flash memory, static random access memory (SRAM), etc.), and a data storage system 404, which communicate with each other via a bus 450. The data storage system 404 is analogous to the memory sub-system 104 illustrated in FIG. 1.

The processing device 410 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 410 can also be one or more special-purpose processing devices such as an ASIC, an FPGA, a digital signal processor (DSP), network processor, or the like. The processing device 410 is configured to execute instructions 444 for performing the operations and steps discussed herein. The computing system 400 can further include a network interface device 412 to communicate over a network 448.

The data storage system 404 can include a machine-readable storage medium 452 (also known as a computer-readable medium) on which is stored one or more sets of instructions 444 or software embodying one or more of the methodologies or functions described herein. The instructions 444 can also reside, completely or at least partially, within the main memory 446 and/or within the processing device 410 during execution thereof by the computing system 400, the main memory 446 and the processing device 410 also constituting machine-readable storage media.

In one embodiment, the instructions 444 include instructions to implement functionality corresponding to the trim circuitry 124 of FIG. 1. The instructions can include trims 424 tailored to performance targets for operating block groups. While the machine-readable storage medium 452 is shown in an example embodiment to be a single medium, the term "machine-readable storage medium" should be taken to include a single medium or multiple media that store the one or more sets of instructions. The term "machine-readable storage medium" shall also be taken to include a medium that is capable of storing or encoding a set of instructions for execution by the machine and that cause the machine to perform one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a machine-readable storage medium, such as, but not limited to, types of disks, semiconductor-based memory, magnetic or optical cards, or other types of media suitable for storing electronic instructions.

The present disclosure can be provided as a computer program product, or software, that can include a machine-readable medium having stored thereon instructions, which can be used to program a computer system (or other electronic devices) to perform a process according to the present disclosure. A machine-readable medium includes a mechanism for storing information in a form readable by a machine (e.g., a computer).

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
    receiving, for each of a plurality of applications, a respective definition of a performance target;
    creating a plurality of partitions according to the respective definitions;
    assigning each of the plurality of partitions to a respective one of a plurality of block groups; and
    operating each of the plurality of block groups with a respective trim tailored to the respective performance target.

2. The method of claim 1, wherein operating each of the plurality of block groups with a respective trim tailored to the respective performance target comprises:
    operating a first block group with a first trim tailored to data retention;
    operating a second block group with a second trim tailored to memory cell endurance; and
    operating a third block group with a third trim tailored to a balance between data retention and memory cell endurance.

3. The method of claim 1, wherein receiving the respective definition comprises receiving a definition of more than one performance target for a particular one of the plurality of applications.

4. The method of claim 1, wherein assigning each of the plurality of partitions comprises assigning more than one of the plurality of partitions to a particular one of the plurality of block groups in response to the more than one of the plurality of partitions having a same performance target.

5. The method of claim 1, further comprising wear leveling each of the plurality of block group separately.

6. The method of claim 1, further comprising operating each of the plurality of block groups as a separate logical unit with the respective trim.

7. The method of claim 1, further comprising operating each of the plurality of block groups as part of one logical unit; and
    issuing a set trim command to operate a second block group with a second trim after operating a first block group with a first trim.

8. The method of claim 1, further comprising providing a respective logical address for each of the plurality of partitions to a host of the plurality of applications; and
    receiving memory access requests from the host using the respective logical addresses and a logical block address.

9. A system, comprising:
    a controller; and
    a memory device coupled to the controller;
    wherein the controller is configured to:

logically divide physical blocks of the memory device into a quantity of block groups equal in number to a quantity of unique performance targets of a plurality of applications that use the system for storage; and operate each of the block groups with a different trim tailored to a respective one of the unique performance targets.

10. The system of claim 9, wherein the controller is configured to operate a particular block group by issuing a set trim command to cause the memory device to use the trim for commands directed to the particular block group.

11. The system of claim 10, wherein the controller is configured to issue the set trim command in response to receipt of a request from a host directed to a different one of the block groups than a previously fulfilled request.

12. The system of claim 9, wherein each of the plurality of applications is a different vehicle application.

13. The system of claim 12, wherein each of the different vehicle applications comprises a different virtual computing instance.

14. The system of claim 12, wherein the different vehicle applications comprise infotainment, instrument cluster, and black box; and wherein the unique performance targets comprise data retention, memory cell endurance, and balanced data retention and memory cell endurance.

15. The system of claim 9, wherein the controller is further configured to:

create a respective partition for each of the plurality of applications; and create respective additional partitions for each of the plurality of applications that have more than one performance target.

16. The system of claim 15, wherein the controller is configured to receive, from a host, a definition of:

the unique performance targets;

a quantity of performance targets for each of the plurality of applications; and a respective size of each partition.

17. The system of claim 15, wherein the controller is further configured to:

associate each partition with a respective performance target; and assign each partition to a respective one of the block groups based on the respective performance target associated therewith.

18. The system of claim 17, wherein the controller being configured to assign each partition to a respective one of the block groups comprises the controller being configured to store a correspondence between each partition and the respective one of the block groups in an address table.

19. The system of claim 9, wherein the controller is configured to perform wear leveling within each of the block groups separately.

20. A system, comprising:

a processing device;

a memory sub-system coupled to the processing device; and a memory device coupled to the processing device and storing instructions that when executed by the processing device:

run a plurality of vehicle applications;

define respective performance targets for each of the plurality of vehicle applications; and address requests to the memory sub-system with a respective partition identifier corresponding to the respective performance target for each of the plurality of vehicle applications.

21. The system of claim 20, wherein the plurality of vehicle applications comprise an instrument cluster, an infotainment system, and a black box.

22. The system of claim 20, further comprising instructions to define respective partition sizes for each of the plurality of vehicle applications.

* * * * *